United States Patent [19]
Schoeller

[11] Patent Number: 5,988,777
[45] Date of Patent: Nov. 23, 1999

[54] STACKING COLUMN FOR STORING ARTICLES

[75] Inventor: Heinz Schoeller, Rielasingen-Worblingen, Germany

[73] Assignee: mts Maschinenbau GmbH, Germany

[21] Appl. No.: 09/110,768

[22] Filed: Jul. 6, 1998

[30] Foreign Application Priority Data

Jul. 9, 1997 [DE] Germany .......................... 197 29 444

[51] Int. Cl.⁶ .............................. A47B 81/06; A47F 5/00
[52] U.S. Cl. ..................... 312/9.58; 312/190; 211/41.1
[58] Field of Search ................ 312/9.58, 9.41, 312/9.42, 26, 30, 107.5, 189, 190, 327, 271, 270.2; 211/59.4, 41.1, 41.14; 198/347.1, 347.2, 347.4

[56] References Cited

U.S. PATENT DOCUMENTS

| | | | |
|---|---|---|---|
| 952,573 | 3/1910 | Munger | 312/190 |
| 4,160,571 | 7/1979 | Bigotti | 312/327 |
| 5,005,712 | 4/1991 | Niederprum | 211/41.1 X |
| 5,118,170 | 6/1992 | Olivas | 312/9.58 |
| 5,131,732 | 7/1992 | Lane et al. | 312/190 |
| 5,217,121 | 6/1993 | Walker | 211/41.1 |
| 5,385,399 | 1/1995 | Weidner | 312/190 |

FOREIGN PATENT DOCUMENTS

| | | | |
|---|---|---|---|
| 976447 | 10/1975 | Canada | 312/9.58 |
| 38 11 310 | 10/1989 | Germany . | |
| 40 20 864 | 1/1992 | Germany . | |
| 2275180 | 8/1994 | United Kingdom | 312/270.2 |

*Primary Examiner*—Peter M. Cuomo
*Assistant Examiner*—James O. Hansen
*Attorney, Agent, or Firm*—Bachman & LaPointe, P.C.

[57] ABSTRACT

In the case of a stacking column for storing articles one above the other or one beside the other on ratchet elements, which have a stop or supporting part for the articles and are assigned to at least one side wall, it is intended that the ratchet element be assigned a clamping ratchet and that the ratchet element can be secured in its operating position.

12 Claims, 1 Drawing Sheet

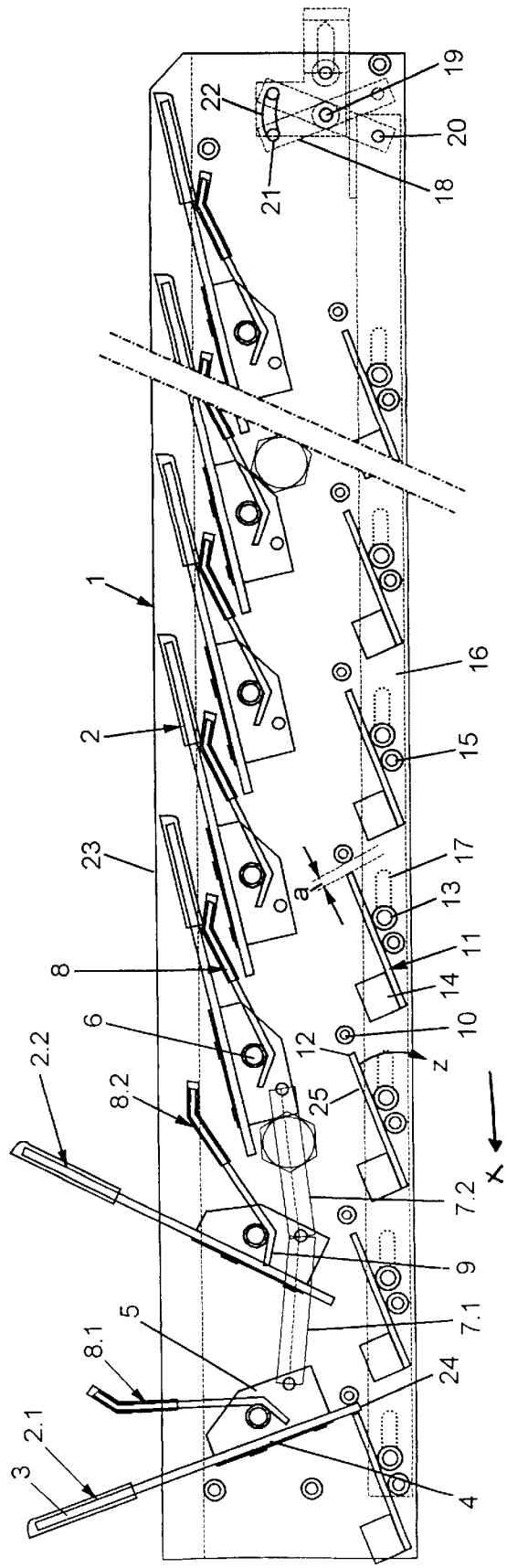

5,988,777

STACKING COLUMN FOR STORING ARTICLES

BACKGROUND OF THE INVENTION

The present invention relates to a stacking column for storing articles one above the other or one beside the other on ratchet elements, which have a stop or supporting part for the articles and are assigned to at least one side wall.

Stacking columns are known, and available on the market, in a wide variety of shapes and designs. Stacking columns are used, in particular, for the production of vehicle-body parts in the automobile industry. Robots are used to remove the appropriate vehicle-body parts from the presses and to store them intermediately in stacking columns before they are processed further. It is usual for four stacking columns to be set up in a rectangle. Each stacking column has a multiplicity of ratchet elements which are arranged one above the other. A first ratchet element is located in the standby position. If an article is positioned on this ratchet element, the ratchet element pivots into the operating position and, at the same time, carries along a following ratchet element, which in this way passes into the standby position. A stacking column of this type is known, for example, from DE 38 11 310 C1.

Stacking columns are also used, however, for the horizontal storage of articles, as is described, for example, in DE 40 20 864 A1. These horizontal stacking columns function in a manner similar to the vertical stacking columns.

In the case of horizontal stacking columns, in particular, there is the problem of the article being prone to tilting in the stored state. This is highly undesirable in many cases since it can result not just in the article being damaged but also in the ratchet elements being adjusted unintentionally.

SUMMARY OF THE INVENTION

The object of the present invention is to provide a stacking column of the above-mentioned type in which guidance of the ratchet element is improved to a considerable extent and it is possible to secure the ratchet element in the end positions.

This object is achieved in that the ratchet element is assigned a clamping ratchet and the ratchet element can be secured in its operating position.

This ensures that an article which is to be retained is secured between the ratchet element and clamping ratchet and cannot slip or tip over.

At the end opposite the stop or supporting part, the ratchet element preferably has a pivot part, which in the operating position of the ratchet element, moves into a latching device. The latching device should be configured such that it is easily releasable, with the result that the ratchet element can pass out of this latching position. For example, the latching device has a pivot lever which in the latching position, by way of an end edge, maintains a clearance from a stop, the pivot part of the ratchet element being received in said clearance. This means that the pivot part of the ratchet element, at least in part, passes over the pivot lever and pushes it away, it being possible for the pivot lever to pivot back into its initial position once the ratchet element has passed over it. This is achieved in that, at the end opposite the end edge, the pivot lever is loaded by a weight.

For the sake of simplicity, the latching device is released by another element causing the pivot lever to pivot. In a straightforward exemplary embodiment, this takes place by means of a pressure-exerting element which presses on part of the pivot lever and pivots the latter about its pin. The pressure-exerting element is preferably arranged on a rail, with the result that a plurality of pressure-exerting elements can operate a plurality of pivot levers.

The clamping ratchet should preferably be moveable with respect to the ratchet element itself, with the result that it too can pass from a rest position into a standby position. After this, however, it should be moveable, together with the ratchet element, into an operating position. This takes place in that the clamping ratchet is arranged on the pivot pin of the ratchet element, but its pivot range is restricted.

Since a multiplicity of ratchet elements are usually provided on a stacking column, it should be possible for these elements to move in dependence on one another. For this purpose, the ratchet elements are connected to one another by a thrust strip, connection taking place eccentrically with respect to the pivot axis of the ratchet elements. The prior art gives a large number of examples as to how ratchet elements of stacking columns pass from a rest position into a standby position and from a standby position into an operating position. For this reason, this will not be described in any more detail.

BRIEF DESCRIPTIONS OF THE DRAWINGS

Further advantages, features and details of the invention can be gathered from the following description of a preferred exemplary embodiment and with reference to the drawing, which, in its single figure, shows a plan view of an open stacking column.

DETAILED DESCRIPTION OF THE PREFERRED EMBODIMENT

Referring to the drawing, the stacking column has at least one side wall 1, and a second side wall is usually also provided, although this is not shown in the present exemplary embodiment. The other side wall is located parallel to, and at a distance from, the side wall 1. The two side walls are preferably of identical design. In the present case, the side wall 1 is shown horizontally, but it goes without saying that it may also be arranged in an upright position in order to form a vertical stacking column.

In the stacking column, ratchet elements 2, which serve for securing articles (not shown specifically) are mounted on the side wall 1. Each ratchet element 2 comprises a stop or supporting part 3 and a pivot part 4. Provided on the pivot part 4 is at least one link plate 5, which is connected to a pivot pin 6. The ratchet element 2 can be pivoted, about this pivot pin 6, from a rest position into a standby position and from a standby position into an operating position. In order that this takes place for all the individual ratchet elements in dependence on one another, the ratchet elements are connected to one another by a thrust strip 7 in each case, only two of said thrust strips 7.1, 7.2 being indicated in the exemplary embodiment shown.

According to the invention, a clamping ratchet 8 is also arranged on the pivot pin 6 In the present exemplary embodiment, this clamping ratchet 8 is curved in the form of an S and has a supporting foot 9 which, in the standby position of the ratchet element 2.1, strikes against the underside of the pivot part 4, thus restricting its angle of rotation about the pivot pin 6.

In the pivot region of the pivot part 4, a stop 10 is also provided on the side wall 1. This stop 10 is assigned a pivot lever 11 which, by way of an end edge 12, maintains a clearance a from the stop 10. On the other side of the pin 13, about which the pivot lever 11 rotates, the pivot lever 11 is loaded by a weight 14, which holds the pivot lever 11 against a pressure-exerting roller 15 arranged beside the pin 13.

The pressure-exerting roller 15 is provided on a rail 16 and can be displaced in the direction x. In this case, the rail 16 is guided by way of the pin 13, which engages in a slot 17.

Provided at the end of the rail 16 is an actuating lever 18 which, on one side of the pivot pin 19, is connected to the rail 16 by an articulation 20, its pivot movement being restricted by a bolt 21, which is provided at the end opposite the articulation 20 and engages in a kidney-shaped slot 22.

The present invention functions as follows:

Upon initial use, all the ratchet elements apart from the ratchet element 2.1 are in the rest position. In this case, the ratchet element 2.2, as well as the clamping ratchet 8.2 assigned to it, are concealed beneath a top edge 23 of the side wall 1. The length of the thrust strip 7.1, however, is such that the first ratchet 2.1 is located in the standby position, as is indicated for the ratchet element 2.2. In this case, the stop or supporting part 3 of the ratchet element 2.1 projects beyond the top edge 23 of the side wall 1, but the clamping ratchet 8.1, on the other hand, is still located beneath the top edge 23, as is illustrated for the clamping ratchet 8.2.

An article is then introduced into said stacking column, it usually being the case that four stacking columns are arranged in a rectangle, provided that the stacking columns are vertical. If they are used as horizontal stacking columns, then two approximately parallel stacking columns are sufficient.

When the article is pushed in, the ratchet element 2.1 is pivoted into the operating position, which is shown in the figure, the article striking against the stop or supporting part 3 and the entire ratchet element 2.1 pivoting about the pivot pin 6. In this case, the clamping ratchet 8.1 also emerges from the side wall 1 and grips behind the article, since a pivot path of the clamping ratchet 8.1 is restricted by the supporting foot 9 striking against the pivot part 4 of the ratchet element 2.1. The article is thus retained between the clamping ratchet 8.1 and the stop or supporting part 3.

Upon pivoting into the operating position, the pivot part 4 of the ratchet element 2.1 comes into contact, by way of its end edge 24, with the pivot lever 11 and moves along the surface 25, the pivot lever 11 pivoting in the direction z. In this case, the end edge 24 of the pivot part 4 passes over the end edge 12 of the pivot lever 11 and moves into the clearance a. The pivot lever 11 then pivots back into its initial position again, under the pressure of the weight 14 with the result that the pivot part 4 is retained between the stop 10 and the end edge 12. This locks the ratchet element 2.1.

When the ratchet element 2.1 pivots into the operating position, it carries along, via the thrust strip 7.1, the ratchet element 2.2 out of its rest position into a standby position. The next article, which is then introduced into the stacking columns, presses on the stop or supporting part of the ratchet element 2.2 and thus moves the ratchet element 2.2 into the operating position, the above-mentioned movement sequence being repeated.

A multiplicity of ratchet elements, and thus also a multiplicity of pivot levers 11, are provided in a stacking column. In order that the ratchet elements 2 may preferably be unlocked together, each pivot lever 11 is assigned a pressure-exerting roller 15 on a rail 16. If the rail 16, which is guided on the pins 13 by way of slots, is moved in the direction x, the pressure-exerting rollers 15 press on the pivot lever 11, with the result that the latter is pivoted in the direction z and the pivot part 4 of the ratchet element 2 is released.

In order that both the locking operation and the unlocking operation can take place as efficiently as possible, it may well be advisable if, in the locked position, the pivot lever is approximately perpendicular with respect to the ratchet element 2, or the pivot part 4 of the ratchet element 2.

In the case of a vertical stacking column but, where desired, also in the case of a horizontal stacking column, it is possible to provide for the pivot lever 11 to be spring-loaded instead of, or in addition to, having the weight 14. For example, it is possible for a torsion spring to be provided on the pivot pin 13.

What is claimed is:

1. A stacking column for storing articles one above the other or one beside the other, which comprises:

ratchet elements; a supporting part of each of said ratchet elements for the articles; and at least one side wall for mounting said ratchet elements; wherein the ratchet elements are assigned a clamping ratchet and wherein the ratchet elements can be secured in an operating position, said ratchet elements having an end opposite said supporting part, wherein at the end opposite said supporting part said ratchet elements have a pivot part which moves into a locking position in the operating position of the ratchet element, said column including a stop and including a pivot lever with an end edge, which in said locking position, by way of said end edge, maintains a clearance (a) from said stop, the pivot part of the ratchet elements being received in said clearance, wherein the pivot lever is mounted on a pin, the end edge being provided on one side of the pin, and wherein the pivot lever is assigned a pressure-exerting element for the purpose of pivoting the pivot lever about the pin.

2. The stacking column according to claim 1, wherein a weight is provided on the pivot lever on the side opposed to the said end edge.

3. The stacking column according to claim 1, wherein the pressure-exerting element is arranged on a rail.

4. The stacking column according to claim 3, wherein at an end of said column the rail is connected to an actuating lever which on one side of the pivot pin is connected to the rail in an articulated manner and, on the other side, is guided by a bolt in a kidney-shaped slot.

5. The stacking column according to claim 1, wherein the pin of the pivot lever passes through a slot in the rail.

6. The stacking column according to claim 1, wherein said ratchet element is mounted on a pivot pin.

7. The stacking column according to claim 6, wherein the clamping ratchet is arranged on the pivot pin.

8. The stacking column according to claim 7, wherein the clamping ratchet has, on one side of the pivot pin, a clamping part and, on the other side, a supporting foot.

9. The stacking column according to claim 8, wherein in a use position of the clamping ratchet, the supporting foot is supported against said ratchet element.

10. The stacking column according to claim 6, wherein a thrust strip is fastened on said ratchet element in an articulated manner and serves to connect one of said ratchet elements to a following ratchet element.

11. The stacking column according to claim 10, wherein a thrust strip can move a following ratchet element into a standby position when a preceding ratchet element passes into the operating position.

12. The stacking column according to claim 11, wherein the clamping ratchet is supported against a ratchet element even in the standby position and passes into the operating position together with said ratchet element.

* * * * *